(12) United States Patent
Matsumoto

(10) Patent No.: US 11,724,312 B2
(45) Date of Patent: Aug. 15, 2023

(54) METHOD FOR PRODUCING THREE-DIMENSIONAL MOLDED OBJECT

(71) Applicant: Sodick Co., Ltd., Kanagawa (JP)

(72) Inventor: Itaru Matsumoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 538 days.

(21) Appl. No.: 16/443,013

(22) Filed: Jun. 17, 2019

(65) Prior Publication Data

US 2020/0023436 A1    Jan. 23, 2020

(30) Foreign Application Priority Data

Jul. 17, 2018    (JP) ................. 2018-134239

(51) Int. Cl.
*B33Y 10/00* (2015.01)
*B22F 10/28* (2021.01)
(Continued)

(52) U.S. Cl.
CPC ................ *B22F 3/24* (2013.01); *B22F 10/28* (2021.01); *B33Y 10/00* (2014.12); *C21D 1/00* (2013.01); *B22F 10/64* (2021.01); *B22F 12/30* (2021.01); *B22F 12/41* (2021.01); *B22F 2003/248* (2013.01); *B22F 2301/35* (2013.01); (Continued)

(58) Field of Classification Search
CPC .. B22F 3/24; B22F 2003/248; B22F 2301/35; B22F 10/60; B22F 12/17; B22F 12/30; C22C 33/02; C22C 33/0271; C21D 1/09; C21D 1/18; C21D 1/26; C21D 1/28; C21D 6/02; C21D 6/04; C21D 9/00; C21D 9/0068; C21D 2211/004; C21D 2211/008; B29B 64/106; B29B 64/153
See application file for complete search history.

(56) References Cited

U.S. PATENT DOCUMENTS 8,999,222 B2   4/2015   Abe et al.
2012/0100030 A1   4/2012   Green et al.
(Continued)

FOREIGN PATENT DOCUMENTS

JP   H11-57081 A   3/1999
JP   2010-215971 A   9/2010
(Continued)

OTHER PUBLICATIONS

Explanation of Circumstances Concerning Accelerated Examination filed on Nov. 27, 2018 in corresponding Japanese Application No. 2018-134239; 2 pages.
(Continued)

*Primary Examiner* — Sally A Merkling
*Assistant Examiner* — Dean Mazzola
(74) *Attorney, Agent, or Firm* — Maier & Maier, PLLC

(57) ABSTRACT

A manufacturing method for a three-dimensional molded object includes repeating formation of a material layer and formation of a solidified layer, the material layer being formed by spreading a metal material on a base plate and the solidified layer being formed by irradiating the material layer with a laser beam or an electron beam, thereby molding a solidified body which is a laminated solidified layer on the base plate; and subjecting the base plate and the solidified body after molding to a heat treatment.

2 Claims, 12 Drawing Sheets

(51) Int. Cl.
  *C21D 1/00* (2006.01)
  *B22F 12/30* (2021.01)
  *B22F 10/64* (2021.01)
  *C21D 1/18* (2006.01)
  *C21D 1/26* (2006.01)
  *B22F 3/24* (2006.01)
  *B33Y 40/00* (2020.01)
  *B22F 12/41* (2021.01)

(52) U.S. Cl.
  CPC ............... *B33Y 40/00* (2014.12); *C21D 1/18* (2013.01); *C21D 1/26* (2013.01); *C21D 2211/008* (2013.01)

(56) References Cited

U.S. PATENT DOCUMENTS

| | | | |
|---|---|---|---|
| 2012/0308781 A1 | 12/2012 | Abe et al. | |
| 2013/0065073 A1* | 3/2013 | Fuwa | C22C 38/105 428/548 |
| 2013/0068735 A1 | 3/2013 | Morisada et al. | |
| 2013/0069282 A1 | 3/2013 | Abe et al. | |
| 2015/0314366 A1 | 11/2015 | Kawano | |
| 2015/0328713 A1* | 11/2015 | Miyazaki | B23K 15/0093 219/76.12 |
| 2018/0147779 A1 | 5/2018 | Yamada et al. | |
| 2018/0236532 A1* | 8/2018 | Forsmark | B33Y 10/00 |
| 2019/0061001 A1 | 2/2019 | Araie et al. | |
| 2019/0263056 A1* | 8/2019 | Motoyama | B22F 7/08 |

FOREIGN PATENT DOCUMENTS

| | | |
|---|---|---|
| JP | 2013-163829 A | 8/2013 |
| JP | 5579839 B2 | 8/2014 |
| JP | 5653657 B2 | 1/2015 |
| JP | 2015-209588 A | 11/2015 |
| JP | 6220459 B1 | 10/2017 |
| JP | 6295001 B1 | 3/2018 |
| WO | 2011/102382 A1 | 8/2011 |
| WO | 2011/118784 A1 | 9/2011 |
| WO | 2011/149101 A1 | 12/2011 |

OTHER PUBLICATIONS

Japanese Office Action dated Mar. 12, 2019 in corresponding Japanese Application No. 2018-134239; 10 pages.

\* cited by examiner

| material name | type of material | difference in dimensional change | corresponding figure | suitability |
|---|---|---|---|---|
| SUS420J2 | martensitic stainless steel | none | Fig. 12A | superior |
| SKD11 | cold working alloy tool steel | small | Fig. 12A | good |
| S45C | carbon steel for machine structural use | small | Fig. 12A | good |
| NAK55 | prehardened steel | medium | Fig. 12B | below average |
| SS400 | steel for general structural use | medium | Fig. 12B | below average |
| MAS-1 | maraging steel | large | Fig. 12C | poor |
| SUS630 | precipitation hardening stainless steel | large | Fig. 12C | poor |

Fig. 11

METHOD FOR PRODUCING THREE-DIMENSIONAL MOLDED OBJECT

Priority is claimed on Japanese application No. 2018-134239, filed Jul. 17, 2018, the content of which are incorporated herein by reference.

BACKGROUND OF THE INVENTION

Field of the Invention

The present invention relates to a method for producing a three-dimensional molded object.

Background of the Invention

There are plurality of methods for lamination molding of metal. For example, U.S. Pat. No. 8,999,222 discloses a powder bed fusion method. In the powder bed fusion method, first of all, a material layer made of a material powder spread with predetermined thickness is formed. A predetermined portion of the material layer is irradiated with a laser beam or an electron beam to sinter or melt the material powder at the irradiated portion, thereby forming a solidified layer. Formation of the material layer and the solidified layer as such are repeated, thereby molding a solidified body having a desired three-dimensional shape, which is a lamination of a plurality of solidified layers. Hereinafter, sintering and melting are included in and referred to as solidifying.

Generally, a base plate is placed in a lamination molding apparatus, and the solidified body is molded on the base plate. After molding, there are cases where the base plate is cut from the solidified body, and there are also cases where an entire base plate or a portion of the base plate is used to obtain a desired three-dimensional molded object.

In addition, there are cases where a predetermined heat treatment is carried out with the three-dimensional molded object after molding. For example, when the three-dimensional molded object is a product which requires strength as for a die, it is necessary to perform a treatment with thermal effect such as quenching and tempering in order to improve hardness.

SUMMARY OF INVENTION

Technical Problem

When a three-dimensional molded object comprising a solidified body and at least a portion of a base plate is subjected to a heat treatment, each of the solidified body and the base plate individually undergoes volumetric change due to transformation in structure derived from its specific heat treatment characteristics. When a difference between the volumetric change of the solidified body and the base plate becomes large at some point of time, deformation may occur in the three-dimensional molded object, resulting in degradation of form accuracy. In addition, cracks may occur in a vicinity of a boundary of the solidified body and the base plate, resulting in damage of the three-dimensional molded object.

The present invention has been made by taking these circumstances into consideration. An object of the present invention is to suppress degradation of form accuracy after the heat treatment or to suppress damage of the three-dimensional molded object, where the three-dimensional molded object includes the solidified body as the upper part and the base plate as the lower part.

Means to Solve the Problem

According to the present invention, a manufacturing method for a three-dimensional molded object, comprising: repeating formation of a material layer and formation of a solidified layer, the material layer being formed by spreading a metal material on a base plate and the solidified layer being formed by irradiating the material layer with a laser beam or an electron beam, thereby molding a solidified body which is a laminated solidified layer on the base plate; and subjecting the base plate and the solidified body after molding to a heat treatment; wherein: the base plate is a non-heat treated metal before molding, expands when the solidified body expands and shrinks when the solidified body shrinks by the heat treatment; and a material of the base plate is different from a material of the solidified body, is provided.

Effect of the Invention

In the present invention, the base plate which constitutes a lower part of the three-dimensional molded object has a heat treatment characteristics similar to a heat treatment characteristics of the solidified body which constitutes an upper part of the three-dimensional molded object. That is, during the heat treatment, when the solidified body expands, the base plate also expands, and when the solidified body shrinks, the base plate also shrinks. Accordingly, when the three-dimensional molded object is subjected to the heat treatment, a dimension or a volume of the base plate changes in accordance with the same heat treatment characteristics as the solidified body, and thus a difference between the volumetric change of the solidified body and the base plate during transformation in the structure due to the heat treatment would not occur by an extreme degree. In other words, when the heat treatment is performed, the dimension of the base plate and the solidified body changes in a similar manner. Therefore, deformation of the three-dimensional molded object is suppressed, and degradation of form accuracy of the three-dimensional molded object and damage of the three-dimensional molded object are suppressed.

BRIEF DESCRIPTION OF THE DRAWINGS

The above further objects, features and advantages of the present invention will become more apparent from the following detailed description taken in conjunction with the accompanying drawings, wherein:

FIG. 11 is a table showing materials of a base plate 7 and a result of difference in dimensional change between a solidified body 81 and the base plate 7.

DESCRIPTION OF THE PREFERRED EMBODIMENTS

Hereinafter, the embodiments of the present invention will be described with reference to the drawings. Here, the characteristic matters shown in the embodiments can be combined with each other. In addition, each of the characteristic constitution can individually constitute an invention. Here, in each of the figures, a part of the constitutions may be omitted for better visibility.

Figure 1:
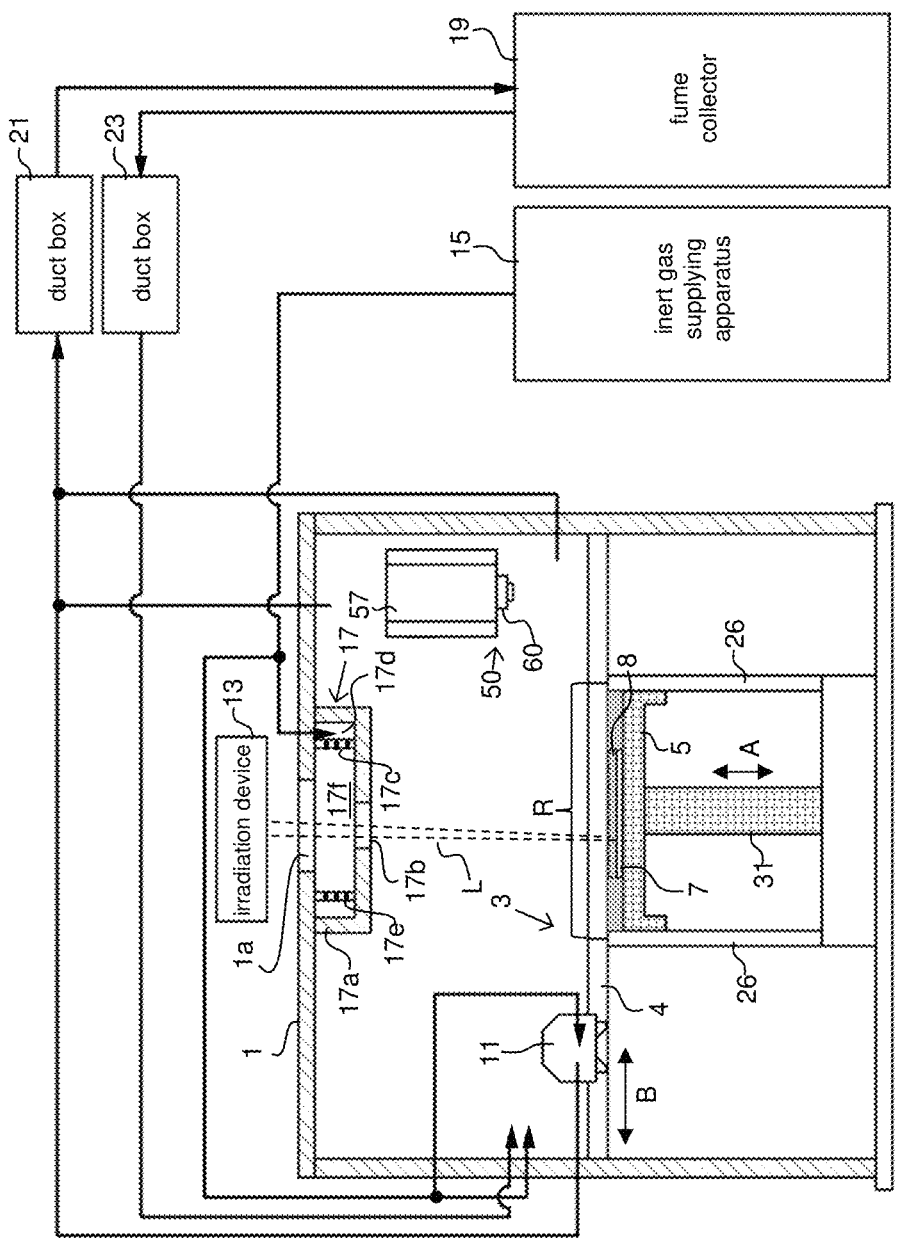
FIG. 1 is a rough structural diagram of a lamination molding apparatus according to an embodiment of the present invention.

FIG. 1 shows a lamination molding apparatus utilized in the manufacturing method of the present invention, which molds a three-dimensional molded object structured with a solidified body 81 and at least a portion of a base plate 7. The lamination molding apparatus according to the present embodiment forms a material layer 8 made of a material powder, and irradiates a predetermined portion of the material layer 8 with a laser beam L, thereby solidifying the material powder at the irradiated portion to form a solidified layer. The lamination molding apparatus repeats formation of the material layer 8 and the solidified layer, thereby laminating a plurality of solidified layers to mold the solidified body 81 having a desired three-dimensional shape. Hereinafter, lamination molding to mold the solidified body 81 performed by the lamination molding apparatus is referred to simply as molding. The lamination molding apparatus according to the present embodiment comprises a chamber 1, a material layer forming device 3, an irradiation device 13, and a cutting device 50.

The chamber 1 covers a predetermined molding region R which is a region in which the solidified body 81 is formed. The chamber 1 is supplied with an inert gas with a predetermined concentration, and discharges an inert gas containing fume generated during solidification of the material layer 8. In addition, the inert gas discharged from the chamber 1 is returned back into the chamber 1 after removal of the fume. Specifically, the chamber 1 is connected to an inert gas supplying apparatus 15, and to a fume collector 19 via duct boxes 21 and 23. The inert gas supplying apparatus 15 is, for example, an inert gas generator of a membrane separation method or a PSA method, or a gas cylinder storing the inert gas. The inert gas supplying apparatus 15 supplies the inert gas from a supplying opening provided to the chamber 1, and fills the chamber 1 with the inert gas with a predetermined concentration. In addition, the inert gas including a large amount of fume discharged from a discharging opening of the chamber 1 is sent to the fume collector 19, and is then sent back to the chamber 1 after removal of the fume. Here, in the present specification, inert gas is a gas which substantially does not react with the material layer 8, and a suitable gas is selected among nitrogen, argon, helium and the like, depending on the type of the material layer 8.

In the chamber 1, the material layer forming device 3 is provided. The material layer forming device 3 comprises a base table 4 and a recoater head 11. The base table 4 comprises the molding region R in which the three-dimensional molded object is formed. In the molding region R, a molding table 5 is provided. The molding table 5 can be moved in a vertical direction (shown by arrow A in FIG. 1) by a molding table driving mechanism 31. When the lamination molding apparatus is used, the base plate 7 is placed on the molding table 5, and the material layer 8 is formed on the base plate 7. The base plate 7 will be explained in detail later. A predetermined irradiation region exists within the molding region R, and approximately matches a region surrounded by a contour shape of the solidified body 81. Powder retaining walls 26 are provided so as to surround the molding table 5. Non-solidified material powder is retained in a powder retaining space surrounded by the powder retaining walls 26 and the molding table 5.

Figure 2:
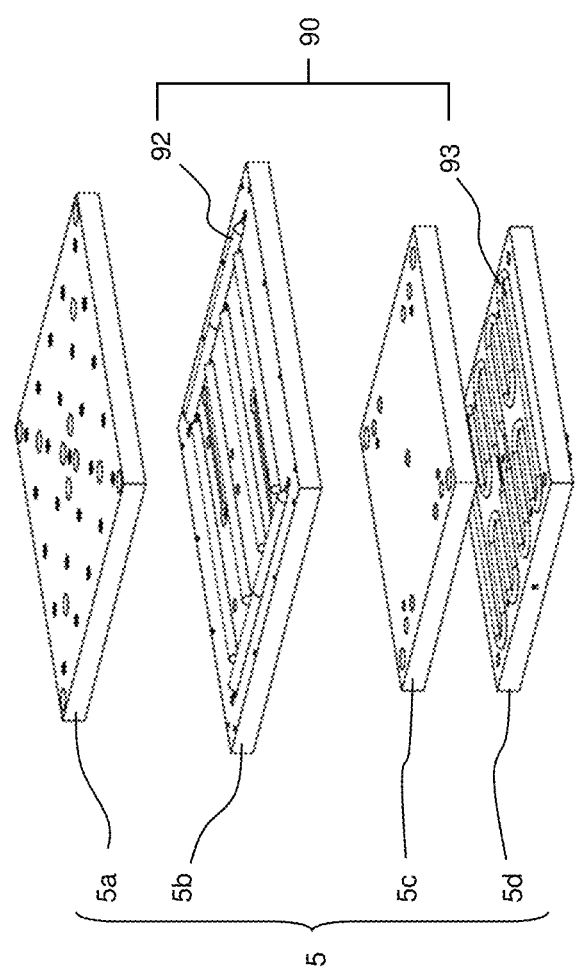
FIG. 2 is a rough structural diagram of a molding table 5 according to the embodiment of the present invention.

As shown in FIG. 2, the molding table 5 includes a temperature adjusting device 90, which is configured to be capable of adjusting a temperature of the molding table 5. The molding table 5 comprises a top plate 5a and three supporting plates 5b, 5c, and 5d. The temperature adjusting device 90 comprises a heater 92 provided in between the top plate 5a and the supporting plate 5b, and a cooler 93 provided in between the supporting plate 5c and the supporting plate 5d. When the solidified layer is formed, it is preferable to preheat the material layer 8 by heating the molding table 5 to a predetermined temperature by the temperature adjusting device 90. In addition, during molding, the solidified layer can be heated and cooled within a temperature range between a martensite start temperature of the solidified layer (Ms) and a martensite finish temperature of the solidified layer (Mf), by the temperature adjusting device 90. That is, each time one or more solidified layers are formed, the one or more solidified layers are subjected to temperature adjustment from a first temperature to a second temperature, the first temperature being martensite finish temperature or higher, and the second temperature being lower than the first temperature and martensite start temperature or lower. By controlling the temperature as such, molding can be performed while relaxing a tensile stress caused by thermal shrinkage of the solidified layer with a compressive stress caused by martensite transformation.

Figure 3:
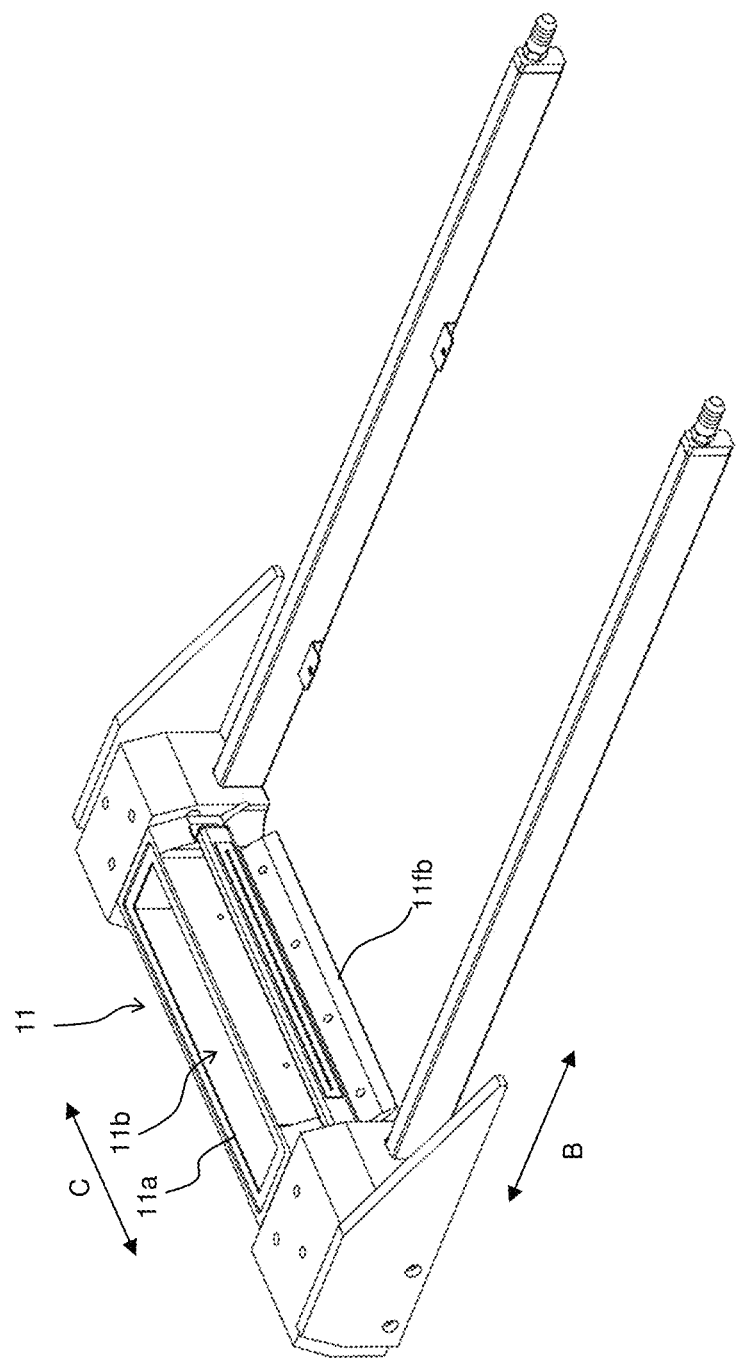
FIG. 3 is a perspective view of a recoater head 11 according to the embodiment of the present invention.
Figure 4:
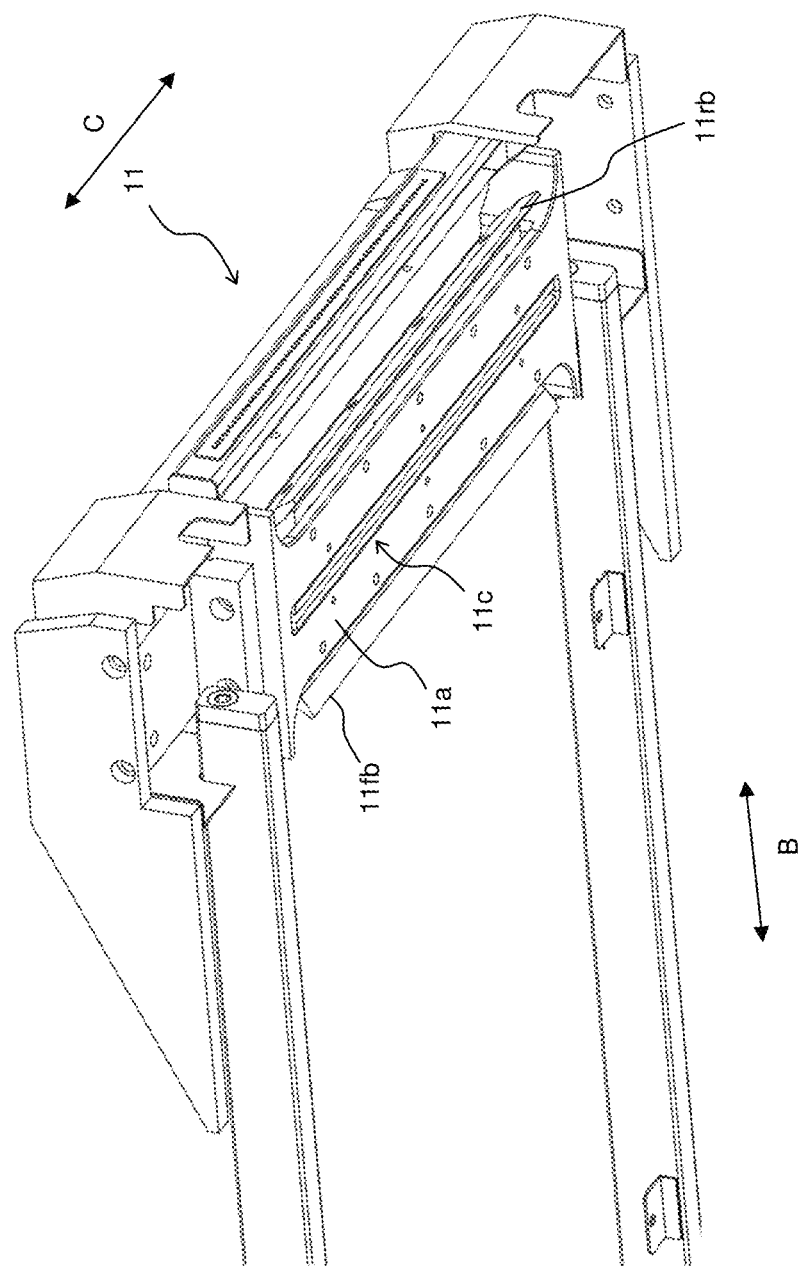
FIG. 4 is a perspective view of the recoater head 11 according to the embodiment of the present invention, observed from another angle.

As shown in FIG. 3 and FIG. 4, the recoater head 11 comprises a material holding section 11a, a material supplying section 11b, and a material discharging section 11c. The material holding section 11a stores the material powder. The material supplying section 11b is provided on an upper surface of the material holding section 11a, and receives the material powder supplied from a material supplying device (not shown) to the material holding section 11a. The material discharging section 11c is provided on a bottom surface of the material holding section 11a, and discharges the material powder in the material holding section 11a. Here, the material discharging section 11c has a slit shape which elongates in a horizontal direction (direction shown by arrow C) crossing orthogonally with a moving direction (direction shown by arrow B) of the recoater head 11.

A blade 11*fb* is provided on one side of the recoater head 11, and a blade 11*rb* is provided on the other side of the recoater head 11. The blades 11*fb* and 11*rb* spread the material powder. In other words, the blades 11*fb* and 11*rb* form the material layer 8 by planarizing the material powder discharged from the material discharging section 11*c*.

Figure 5:
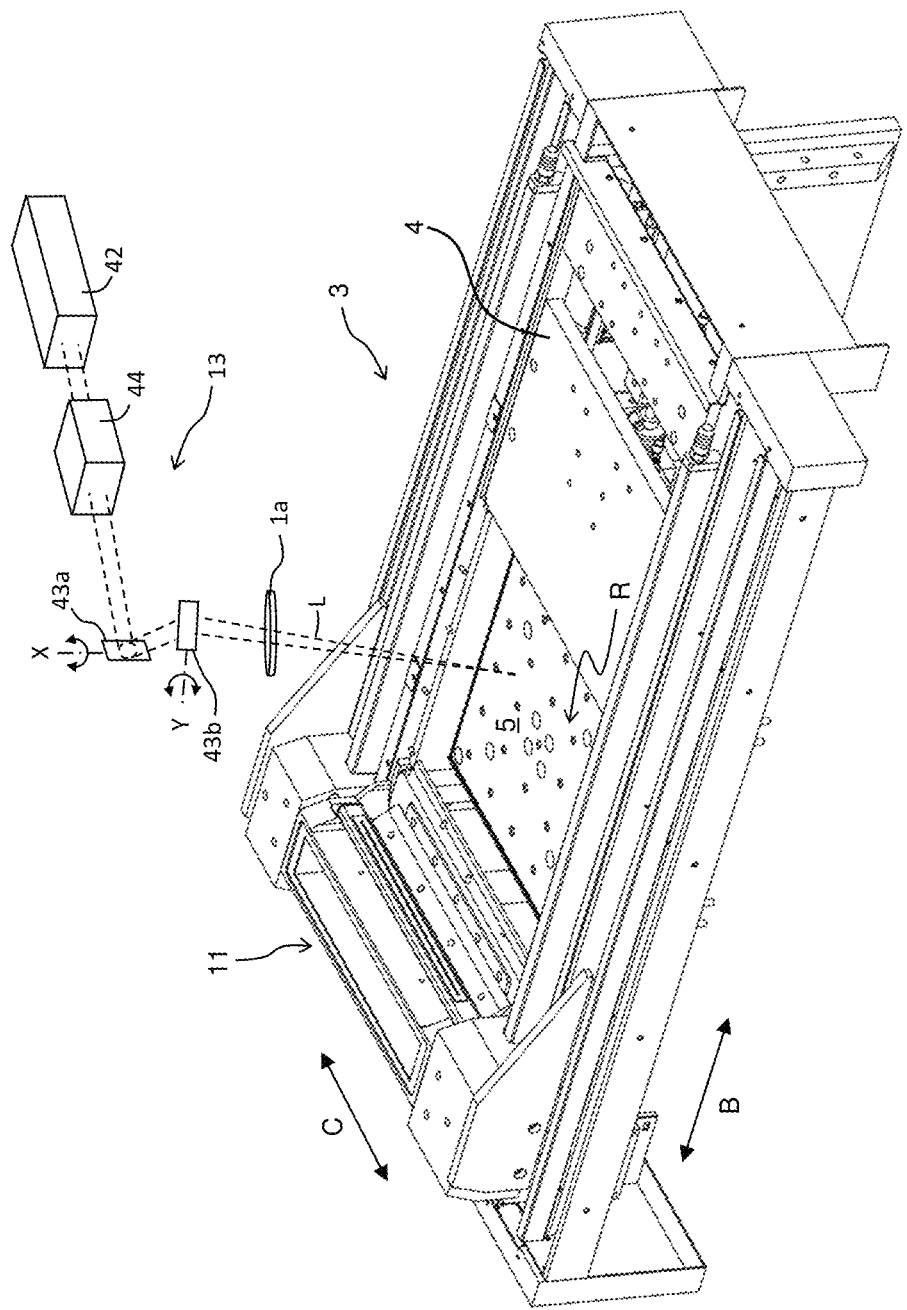
FIG. 5 is a rough structural diagram of an irradiation device 13 according to the embodiment of the present invention.

The irradiation device 13 is provided above the chamber 1. There is no particular limitation with the irradiation device 13 so long as it can emit the laser beam L or an electron beam to solidify the material layer 8. The irradiation device 13 of the present embodiment irradiates the predetermined portion of the material layer 8 formed on the molding region R with the laser beam L and solidifies the material powder at the irradiated portion. Specifically, as shown in FIG. 5, the irradiation device 13 comprises a light source 42, a two-axis galvanometer scanner, and a focus control unit 44. The galvanometer scanner comprises a pair of galvanometer mirrors 43*a* and 43*b*, and actuators rotating each of the galvanometer mirrors 43*a* and 43*b*.

The light source 42 emits the laser beam L. Here, the laser beam L is a laser capable of solidifying the material powder, and is for example, $CO_2$ laser, fiber laser, YAG laser.

The focus control unit 44 focuses the laser beam L output from the light source 42 and adjusts a diameter of the laser beam L to a desired size.

The galvanometer mirrors 43*a* and 43*b* perform two-dimensional scanning with the laser beam L emitted from the light source 42. Each of the galvanometer mirrors 43*a* and 43*b* is controlled of its rotation angle depending on a size of the rotation angle controlling signal input from a control device (not shown). Accordingly, the laser beam L can be emitted to a desired position by altering the size of the rotation angle controlling signal being input to each of the actuators of the galvanometer scanner.

The laser beam L which passed through the galvanometer mirrors 43*a* and 43*b* further passes through a protection window 1*a* provided to the chamber 1. Then, the material layer 8 formed in the molding region R is irradiated with the laser beam L. The protection window 1*a* is formed with a material capable of transmitting the laser beam L. For example, in a case where the laser beam L is fiber laser or YAG laser, the protection window 1*a* can be structured with a quartz glass.

On an upper surface of the chamber 1, a protection window contamination prevention device 17 is provided so as to cover the protection window 1*a*. The protection window contamination prevention device 17 is provided with a cylindrical housing 17*a* and a cylindrical diffusing member 17*c* arranged in the housing 17*a*. An inert gas supplying space 17*d* is provided in between the housing 17*a* and the diffusing member 17*c*. Further, on a bottom surface of the housing 17*a*, an opening 17*b* is provided at an inner portion of the diffusing member 17*c*. The diffusing member 17*c* is provided with a plurality of pores 17*e*, and the clean inert gas supplied into the inert gas supplying space 17*d* is filled into a clean room 17*f* through the pores 17*e*. Then, the clean inert gas filled in the clean room 17*f* is discharged towards below the protection window contamination prevention device 17 through the opening 17*b*.

The cutting device 50 comprises a machining head 57 provided with a spindle 60. The machining head 57 moves the spindle 60 to a desired position by a machining head driving mechanism (not shown). The spindle 60 is configured to rotate a cutting tool such as an end mill (not shown) being attached, and thus cutting can be applied to a surface or an unnecessary portion of the solidified layer obtained by solidifying the material layer 8. Further, the cutting tool preferably comprises a plurality of kinds of cutting tools, and the cutting tool to be used can be changed by an automatic tool changer (not shown) during molding.

Figure 7:
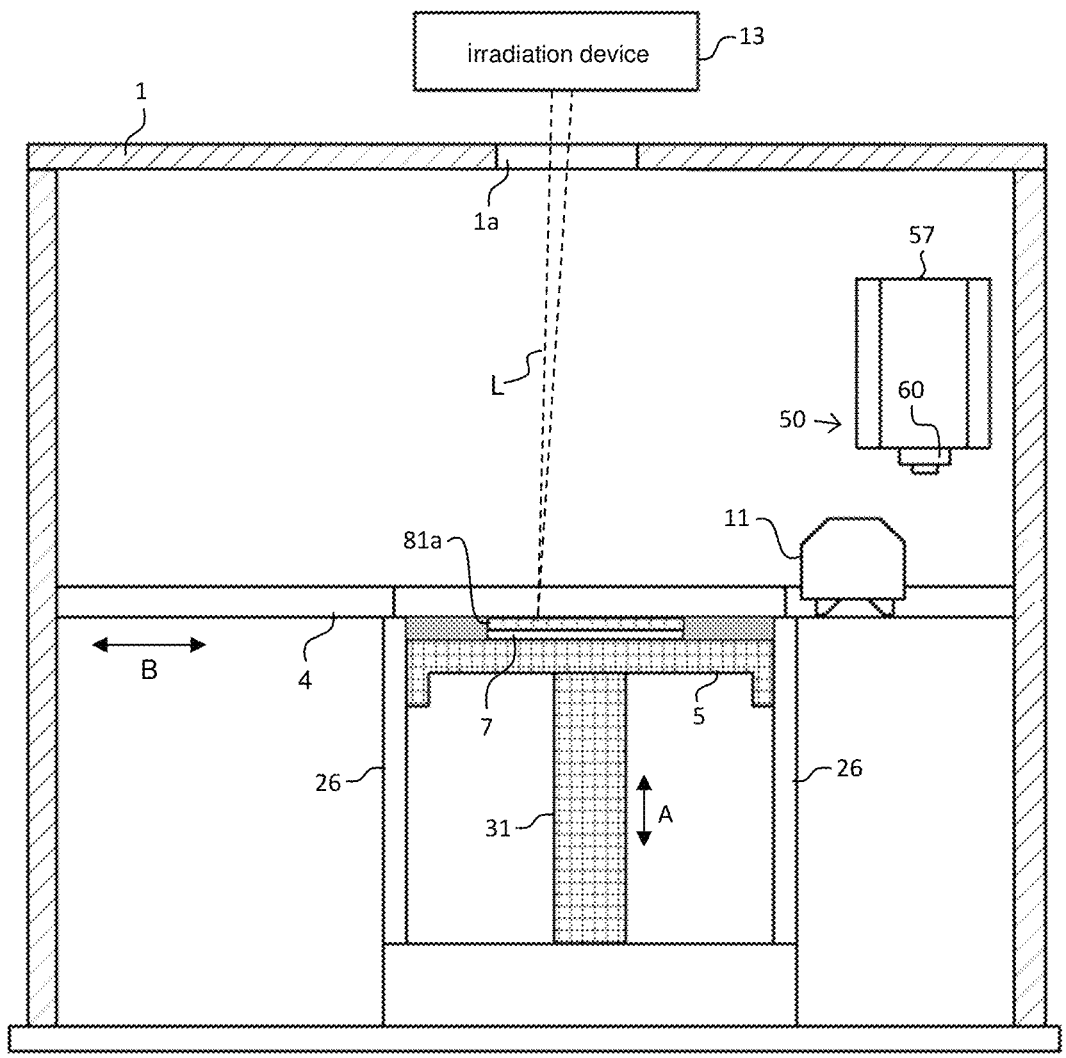
FIG. 7 is an explanatory drawing of the lamination molding method using the lamination molding apparatus according to the embodiment of the present invention.
Figure 8:
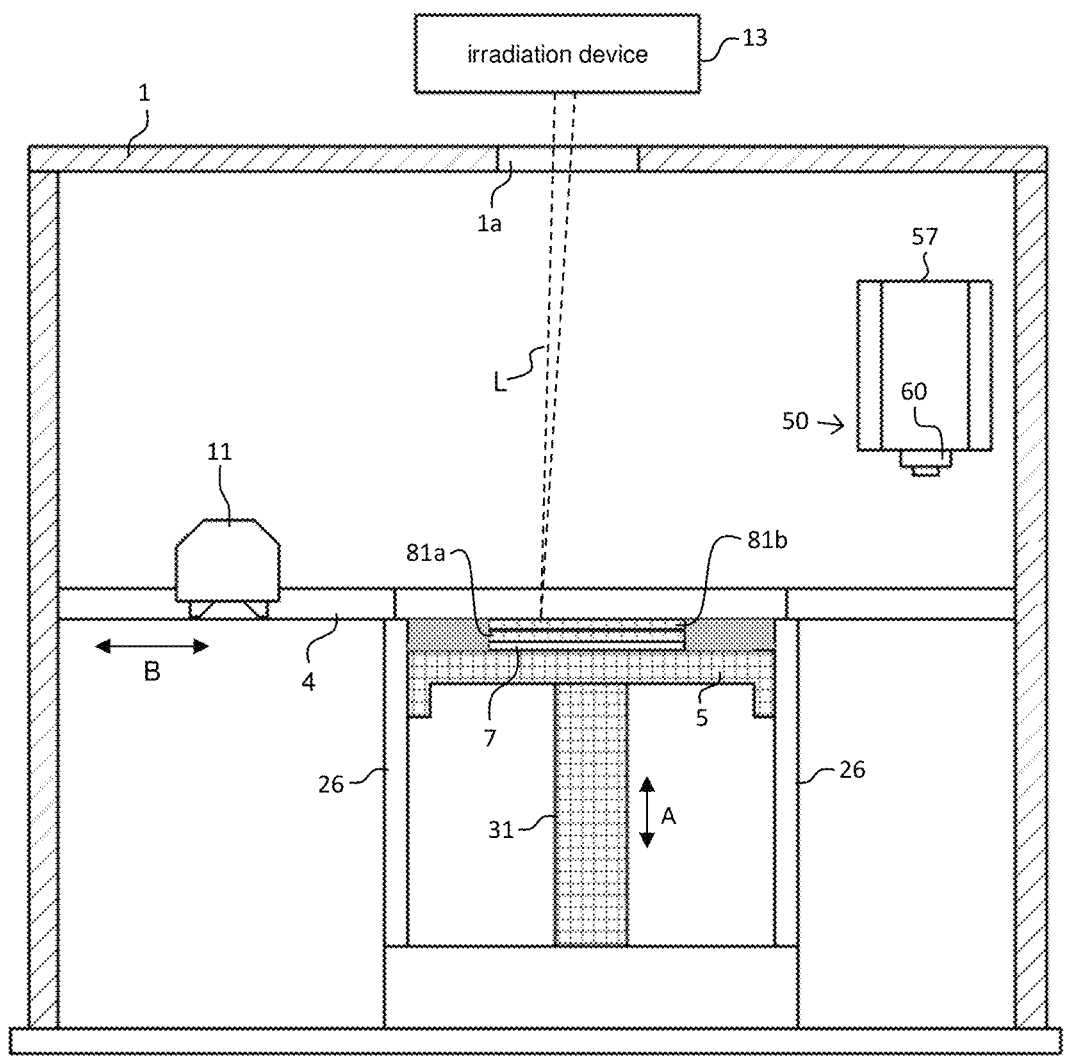
FIG. 8 is an explanatory drawing of the lamination molding method using the lamination molding apparatus according to the embodiment of the present invention.

Hereinafter, a process to mold the solidified body 81 on the base plate 7 by the lamination molding apparatus of the present embodiment will be explained specifically with reference to FIG. 6 to FIG. 8.

Figure 6:
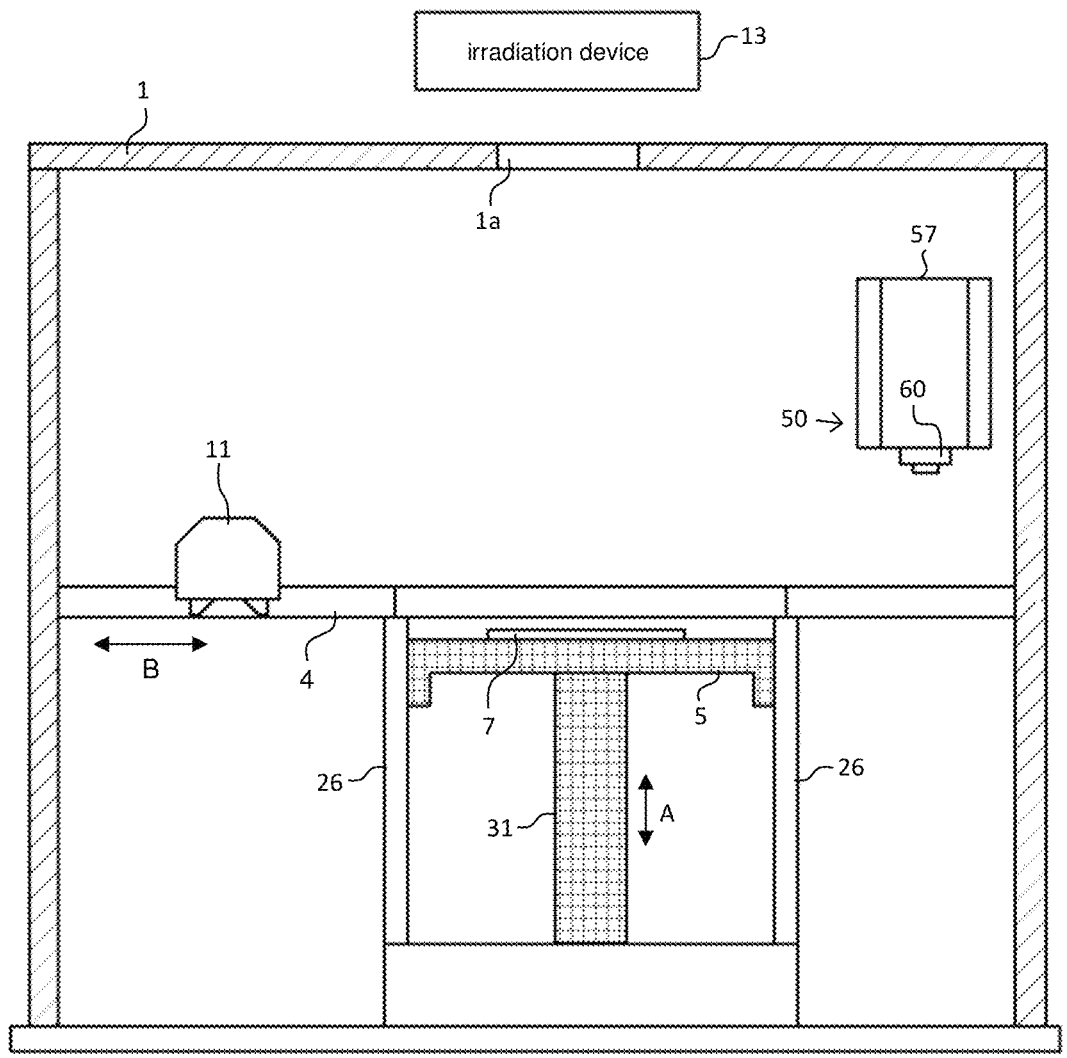
FIG. 6 is an explanatory drawing of a lamination molding method using the lamination molding apparatus according to the embodiment of the present invention.

First, as shown in FIG. 6, the base plate 7 is placed on the molding table 5, and a height of the molding table 5 is adjusted to an appropriate position. In this condition, the recoater head 11 having material holding section 11*a* filled with the material powder moves from a left side to a right side of the molding region R. Accordingly, a first material layer 8 is formed on the base plate 7. Then, a predetermined portion of the first material layer 8 is irradiated with the laser beam L, thereby solidifying the material layer 8. Accordingly, as shown in FIG. 7, a first solidified layer 81*a* is formed.

Subsequently, the molding table 5 is descended by a thickness of the material layer 8. The recoater head 11 moves from the right side to the left side of the molding region R, and a second material layer 8 is formed on the first solidified layer 81*a*. Then, a predetermined portion of the second material layer 8 is irradiated with the laser beam L, thereby solidifying the material layer 8. Accordingly, as shown in FIG. 8, a second solidified layer 81*b* is formed.

As explained above, formation of the material layer 8 and the solidified layer are repeated, thereby molding the desired solidified body 81. Here, each time after a predetermined number of solidified layers are formed, cutting can be performed to an end face of the solidified layer by the cutting device 50. In addition, machining such as cutting, grinding, electric discharge machining can be performed to the base plate 7 or to the solidified body 81 after molding. However, even after machining, at least a portion of the base plate 7 is fixed to the solidified body 81. In the present specification, the at least a portion of the base plate 7 and the solidified body 81 formed on the at least a portion of the base plate 7 are collectively referred to as the three-dimensional molded object.

When a material powder which can achieve martensite transformation by temperature adjustment, such as martensitic stainless steel and carbon steel, is used, the solidified body can be molded while intentionally allowing martensite transformation to proceed as described above. In such case, when the material layer 8 and the solidified layer are formed, the temperature adjusting device 90 sets the temperature of the molding table 5 to the first temperature. The first temperature is a temperature which is martensite finish temperature of the solidified layer or higher. Accordingly, the material layer 8 is preheated, and the solidified layer thus formed is subjected to temperature adjustment to the first temperature. In this condition, the solidified layer includes an austenite phase. After a predetermined number of the solidified layers are formed, the temperature adjusting device 90 sets the temperature of the molding table 5 to the second temperature. The second temperature is lower than the first temperature, and is a temperature which is martensite start temperature of the solidified layer or lower. Accordingly, the temperature of the solidified layer which was subjected to temperature adjustment to the first temperature is cooled to the second temperature. In this condition, at least a portion of the austenite phase of the solidified layer is transformed into a martensite phase. Then, the temperature adjusting device 90 sets the temperature of the molding table to the first temperature again, and formation of the material layer 8 and the solidified layer are restarted. Specific temperature of the first temperature and the second temperature may be changed during molding. By repeating the aforementioned temperature adjustment during molding, the solidified body 81 with relaxed residual stress can be obtained. By suppressing deformation due to residual stress by controlling the temperature of the solidified layer during molding, deformation generated when the solidified body 81 is subjected to a heat treatment after completion of molding can be suppressed.

The three-dimensional molded object thus formed, that is, the base plate 7 and the solidified body 81, is subjected to the heat treatment. As the heat treatment, one or more treatments are selected from quenching, tempering, annealing, age-hardening treatment, normalizing and the like, depending on the intended use of the three-dimensional molded object and a required performance.

Here, specific explanation is given for the suitable base plate 7 for carrying out the present invention. The base plate 7 is a non-heat treated metal, which has not been subjected to the heat treatment before molding. In addition, the base plate 7 is made of a material of which a volume changes when subjected to the heat treatment. In other words, when the heat treatment is carried out, a physical phenomenon other than thermal expansion which allows change in volume, such as transformation, occur with the base plate 7. Here, the base plate 7 is made of a material having a heat treatment characteristics similar to a specific heat treatment characteristics of the material of the solidified body 81.

The solidified body 81 of the present invention is a metal body generated after completion of molding achieved by laminating solidified layers which are formed by lamination molding performed by repeating formation of the material layer and the solidified layer. Especially in the present invention, the solidified body 81 constitutes a portion of an upper part of the desired three-dimensional molded object. On the other hand, the base plate 7 constitutes a portion of a lower part of the desired three-dimensional molded object.

Here, the heat treatment characteristics being similar means that manners of dimensional change or volumetric change with respect to the temperature during the heat treatment consistent with each other. That is, expansion or shrinkage during the heat treatment of the solidified body 81 and the base plate 7 proceeds in a similar manner. If the heat treatment characteristics of the base plate 7 and the solidified body 81 is matched, the base plate 7 expands when the solidified body 81 expands during the heat treatment, and the base plate 7 shrinks when the solidified body shrinks during the heat treatment. Preferably, degree of the dimensional change or the volumetric change is substantially the same so as to suppress degradation of form accuracy and damage. Specifically, curves in a graph showing the dimensional change or the volumetric change with respect to the temperature preferably have approximately the same shape. Accordingly, when the material of the solidified body 81 and the base plate 7 are completely the same, conditions of dimensional change during the heat treatment would be the same, and thus no deformation occur theoretically.

The volumetric change in each of the solidified body 81 and in the base plate 7 of the three-dimensional molded object depends on the physical phenomenon that occur with each of them. For example, when transformation occur with the solidified body 81 by the heat treatment, it is highly possible that a base plate 7 made of a material which transforms in a similar manner as the material of the solidified body 81 can be adopted.

Figure 9A:
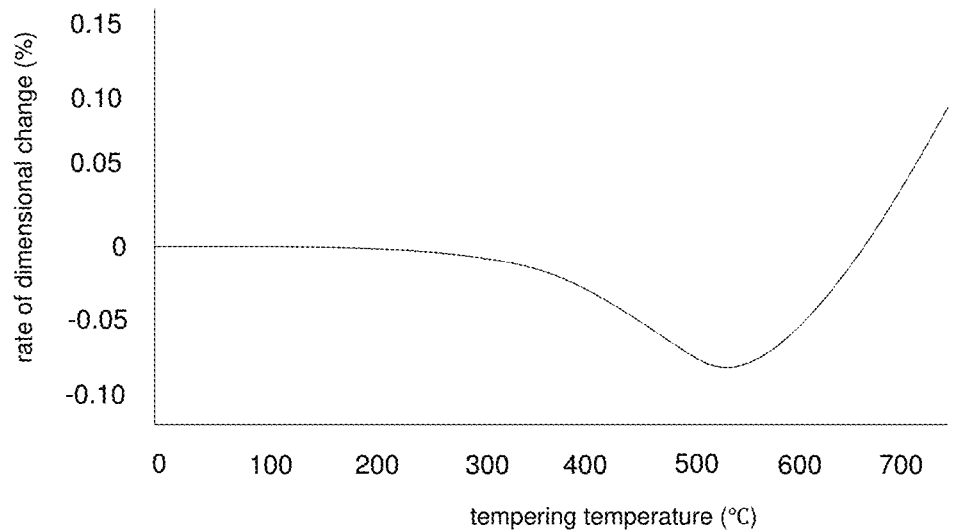
FIG. 9A is a graph showing a relationship between a temperature and a rate of dimensional change during tempering of martensitic stainless steel SUS420J2.
Figure 9B:
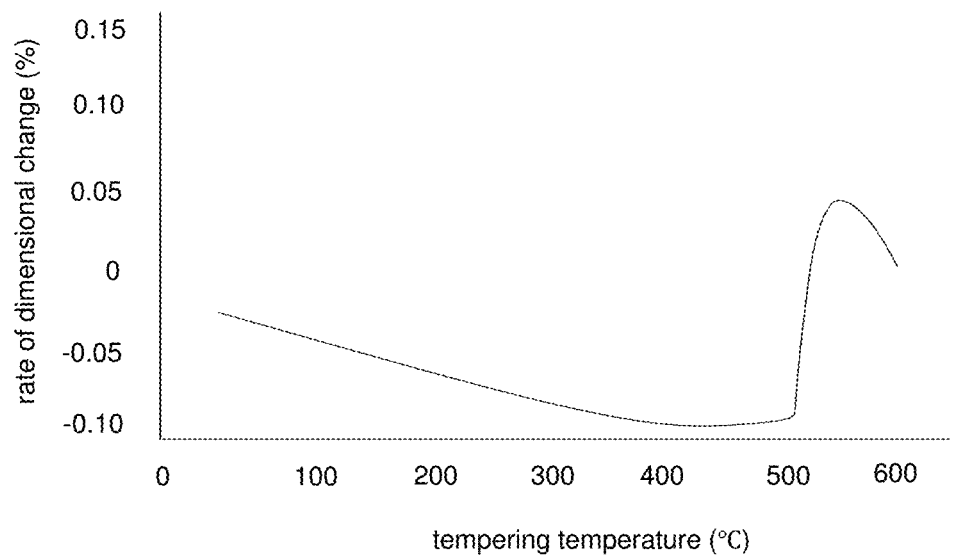
FIG. 9B is a graph showing a relationship between a temperature and a rate of dimensional change during tempering of cold working alloy tool steel SKD11.

For example, the conditions of the dimensional change with respect to temperature when martensitic stainless steel SUS420J2 is subjected to tempering is shown in FIG. 9A. In addition, the conditions of the dimensional change with respect to temperature when cold working alloy tool steel SKD11, which is a kind of a martensitic steel, is subjected to tempering is shown in FIG. 9B. Both of the martensitic stainless steel SUS420J2 and the cold working alloy tool steel SKD11 undergo volumetric expansion by transformation of the austenite phase into the martensite phase when the temperature decrease during quenching. Further, the martensitic stainless steel SUS420J2 and the cold working alloy tool steel SKD11 after quenching undergo the dimensional change during tempering as shown in FIG. 9A and FIG. 9B, respectively. That is, the martensitic stainless steel SUS420J2 and the cold working alloy tool steel SKD11 have a similar heat treatment characteristics. Therefore, when the material of the material powder, that is, the material of the solidified body 81 is martensitic stainless steel, the solidified body 81 and the base plate 7 would have the similar heat treatment characteristics provided that the material of the base plate 7 is a cold working alloy tool steel, which is a martensitic steel material. With such combination of solidified body 81 and the base plate 7, the deformation after the heat treatment can be suppressed.

Figure 10:
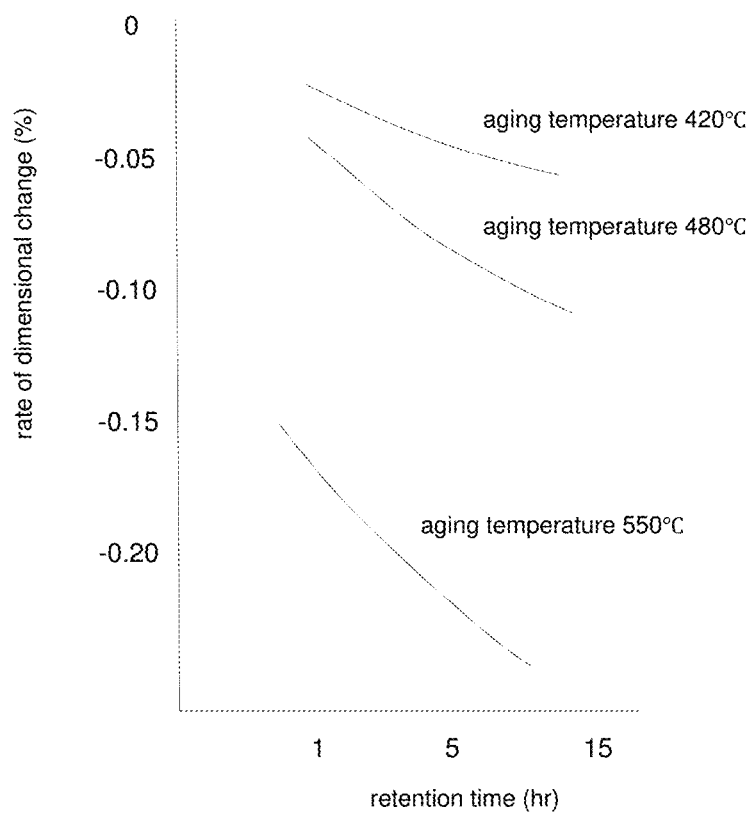
FIG. 10 is a graph showing a relationship between a retention time and a rate of dimensional change during aging treatment of maraging steel.

In addition, for example, when the material of the solidified body 81 is maraging steel, a heat treatment characteristics would be a precipitation hardening type. That is, the solidified body 81 has a characteristics to shrink gradually during aging treatment as shown in FIG. 10. On the other hand, although not shown, precipitation hardening stainless steel SUS630 has a heat treatment characteristics to shrink in volume during aging treatment, in a similar manner as the maraging steel. Therefore, regarding the solidified body 81 made of the maraging steel, by adopting precipitation hardening stainless steel as the material of the base plate 7, deformation after the heat treatment can be suppressed. The maraging steel is rarely distributed as a plate, and it is also difficult to use a base plate 7 made of the maraging steel in terms of cost. Accordingly, when the material of the solidified body 81 is the maraging steel, it is desirable to use a base plate 7 made of the precipitation hardening stainless steel which is relatively easy to obtain.

On the contrary, it is not desirable to use a base plate 7 having a heat treatment characteristics which differ from that of the solidified body 81. For example, when the material of the solidified body 81 is the martensitic stainless steel, it is not desirable to use the base plate 7 made of the precipitation hardening stainless steel. The martensitic stainless steel would expand by the heat treatment, while the precipitation hardening stainless steel would shrink by the heat treatment. Accordingly, since the heat treatment characteristics of the solidified body 81 and the heat treatment characteristics of the base plate 7 approximately run in counter with each other, deformation occur after the heat treatment, resulting in degradation of the form accuracy. In such case, there is a possibility that the three-dimensional molded object would be damaged.

More specifically, when OPM-SUPERSTAR (product name, available from OPM Laboratory Co., Ltd.), which is a kind of the martensitic stainless steel SUS420J2, is used as the material powder for forming the solidified body 81, it is desirable to use STAVAX (product name, available from Uddeholm AB), S-STAR (produce name, available from Daido Steel Co., Ltd.), HPM38 (product name, available from Hitachi Metals, Ltd.) and the like, which are products having improved standards of SUS420J2. Regarding the each material of the base plate 7, the content ratio of the component forming the metal alloy are different with each other, and thus each of the material has a specific heat treatment characteristics. However, all of them are martensitic stainless steel, and thus the heat treatment characteristics thereof are similar with the heat treatment characteristics of the solidified body 81. That is, the dimension or the volume of the base plate 7 during the heat treatment changes in an identical manner as the change in the dimension or the volume of the solidified body 81. With such combination, the degradation of the form accuracy of the three-dimensional molded object after the heat treatment can be suppressed, and thus the damage of the three-dimensional molded object can be avoided.

Representative embodiments and some modification examples of the present invention have been explained. Here, they have been presented merely as examples, and are not intended to limit the scope of the invention. These novel embodiments can be carried out with other various configuration. Various omission, replacement, and alteration can be performed so long as it does not deviate the technical idea of the present invention. These embodiments and modification are included in the scope and the gist of the invention, and are included in the invention defined in the claims and equivalents thereof.

Examples

Hereinafter, the present invention shall be explained with reference to the embodiments, however, the present invention shall not be limited to these embodiments.

A material powder made of SUS420J2 (martensitic stainless steel, carbon content: <0.44 wt %, Ms: approximately 100° C., Mf: approximately 0° C.) having an average particle size of 20 μm was used as the material powder, and lamination molding of a molded product having a size of 80×80×35 mm (length×width×thickness) was carried out on a base plate 7 having a size of 125×125×15 mm (length×width×thickness) under various temperature conditions.

The base plate 7 was placed on the molding table 5, and then lamination molding was carried out by repeating formation of the material layer 8 by spreading the material powder and formation of the solidified layer by irradiating the material layer 8 with the laser beam L. When the solidified layer was formed, the temperature of the molding table 5 was maintained at approximately 70° C. Each time after 100 μm of the solidified layers were laminated, the temperature of the molding table 5 was decreased to approximately 29° C., and the solidified layers were cooled. After cooling the solidified layers, the temperature of the molding table 5 was raised again to approximately 70° C., and the formation of the solidified layers was carried out again. The afore-mentioned procedures were repeated to obtain a solidified body 81 having a size of 80×80×35 mm (length×width×thickness). Subsequently, the three-dimensional molded object constituted with integrated body of the solidified body 81 and the base plate 7 was subjected to quenching and tempering as the heat treatment.

The lamination molding and the heat treatment as explained above were performed using various base plates 7. Specifically, martensitic stainless steel (SUS420J2), cold working alloy tool steel (SKD11), carbon steel for machine structural use (S45C), prehardened steel (NAK55), steel for general structural use (SS400), maraging steel (MAS-1), and precipitation hardening stainless steel (SUS630) were used.

The results of molding in accordance with the material of the base plate 7 are shown in FIG. 11, FIG. 12A, FIG. 12B and FIG. 12C.

Figure 12A:
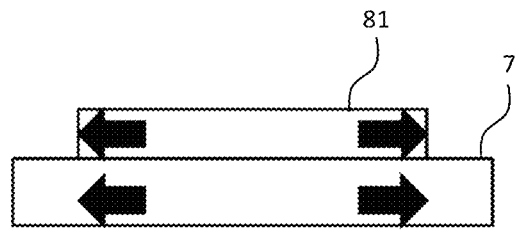
FIG. 12A is a figure showing a difference in the dimensional change of the base plate 7 and the solidified body 81.

When the martensitic stainless steel (SUS420J2) was adopted in a similar manner as the material powder, the volumetric change of the solidified body 81 and the base plate 7 were substantially the same during quenching and tempering. Therefore, there was scarcely any difference in the dimensional change between the solidified body 81 and the base plate 7. As shown in FIG. 12A, there was scarcely any deformation in the three-dimensional molded object.

When carbon steel such as the cold working alloy tool steel (SKD11) and the carbon steel for machine structural use (S45C) was adopted as the base plate 7, the solidified body 81 and the base plate 7 underwent the volumetric change due to the similar heat treatment characteristics during quenching and tempering. That is, both of the solidified body 81 and the base plate 7 expanded by quenching and tempering. Accordingly, the difference in the dimensional change between the solidified body 81 and the base plate 7 was relatively small. As shown in FIG. 12A, degradation of form accuracy of the three-dimensional molded object was suppressed to a relatively low degree.

Figure 12B:
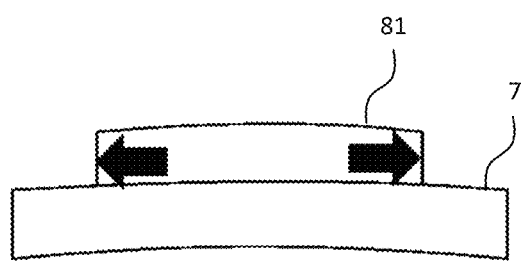
FIG. 12B is a figure showing a difference in the dimensional change of the base plate 7 and the solidified body 81.

When the prehardened steel (NAK55) or the steel for general structural use (SS400) was adopted as the base plate 7, the base plate 7 scarcely underwent any structural transformation by quenching and tempering. Accordingly, there was scarcely any dimensional change in the base plate 7. As shown in FIG. 12B, dimensional difference was generated between the solidified body 81 and the base plate 7 substantially by the amount of expansion of the solidified body 81.

Figure 12C:
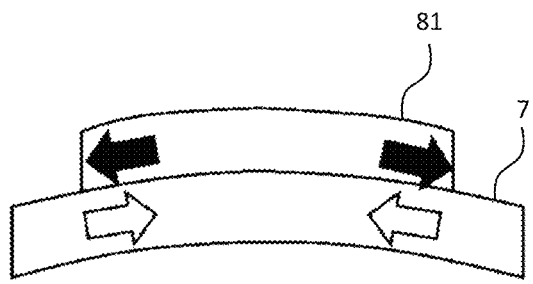
FIG. 12C is a figure showing a difference in the dimensional change of the base plate 7 and the solidified body 81.

When the maraging steel (MAS-1) or the precipitation hardening stainless steel (SUS630) was adopted as the base plate 7, the base plate 7 shrinked by quenching and tempering. Accordingly, as shown in FIG. 12C, a large dimensional difference was generated between the solidified body 81 and the base plate 7. In addition, a large crack occurred in the vicinity of the solidified body 81 and the base plate 7, thereby causing damage in the three-dimensional molded object.

As explained above, as the material of the base plate 7, not only the same material as the solidified body 81, but also a material having the similar heat treatment characteristics, that is, a material having a similar direction for the dimensional change and the volumetric change during the heat treatment can be suitably selected.

The invention claimed is:

1. A manufacturing method for a three-dimensional molded object, comprising:
   repeating formation of a material layer and formation of a solidified layer, the material layer being formed by spreading a metal material on a base plate and the solidified layer being formed by irradiating the material layer with a laser beam or an electron beam, thereby molding a solidified body which is a laminated solidified layer on the base plate; and
   subjecting the base plate and the solidified body after molding to a heat treatment, wherein the base plate is a non-heat treated metal before molding, exhibits the same type of volumetric change of either expansion or shrinkage as the solidified body during the heat treatment, a material of the base plate is different from a material of the solidified body,
   the material of the solidified body is martensitic stainless steel,
   and the material of the base plate is carbon steel.

2. The manufacturing method of claim 1, wherein the heat treatment is at least one selected from the group consisting of quenching, tempering, annealing, age-hardening treatment, and normalizing.

\* \* \* \* \*